Dec. 27, 1932. G. E. GOODRIDGE 1,892,188
COMBUSTION CONTROL DEVICE
Filed Dec. 3, 1928 4 Sheets-Sheet 2

Inventor:
George E. Goodridge

Dec. 27, 1932.  G. E. GOODRIDGE  1,892,188
COMBUSTION CONTROL DEVICE
Filed Dec. 3, 1928   4 Sheets-Sheet 3

Inventor:
George E. Goodridge

Patented Dec. 27, 1932

1,892,188

UNITED STATES PATENT OFFICE

GEORGE E. GOODRIDGE, OF READING, MASSACHUSETTS, ASSIGNOR TO ARTHUR H. BALLARD, INCORPORATED, OF BOSTON, MASSACHUSETTS, A CORPORATION OF MASSACHUSETTS

COMBUSTION CONTROL DEVICE

Application filed December 3, 1928. Serial No. 323,266.

This invention relates to devices for controlling the draft and combustion of heaters, being intended to improve the efficiency and automatic operation of such heaters, and particularly those in which some variable regulation is exercised over the combustion, as by the varying temperature of the space to be heated.

Heaters, whether operated with oil, gas, coal or other fuel, require a certain definite supply of air to promote the most efficient combustion of the fuel employed. If the supply is insufficient, wastage occurs through the passage into the flue of unburned gases. If the supply is in excess of that required, wastage occurs through the absorption of heat by the excess of cold air passing unconsumed into the flue.

This natural draft depends on a variety of conditions, including the variable conditions of the weather and the atmosphere, and the amount of air supplied through natural draft is subject, with the combustion control device, to wide variations. The present invention contemplates the provision of a draft creating device designed to provide ideal air supply and draft conditions, where the amount of air may be maintained substantially constant for any given conditions of combustion, the draft device being subject to such control as renders it effective when and as required.

While the broad features of this invention may be applicable to draft control in connection with the regulation of continuously maintained combustion, as in the case of a constantly maintained coal fire, it has particular application to intermittently operated combustion devices comprising gas or oil burners adapted to be automatically regulated with respect to the intensity of combustion, or to be intermittently operated by being thrown into or out of action in response to the varying temperature requirements.

A supply of air necessary to efficiently promote combustion in the case of intermittently operated combustion devices, even if suitable after the device has been in operation for a substantial period, is often deficient at the time of starting. This is due in large part to the fact that the draft induced by a chilled chimney flue is not great enough to draw through the heater and the flue the volume of air needed fully to support combustion when the device starts into operation. If the heater has been out of operation for any long period of time, particularly during damp weather, or if the flue includes circuitous passages or horizontal pipes, this difference is intensified and such initial draft may be insufficient to displace the inert gases remaining from the previous operation of the combustion device. The initial operation of the device of this character, such as a thermostatically controlled gas or oil burner, is therefore often attended by an uncertain, incomplete and irregular action which continues until the flue becomes more or less heated and the induced draft and air supply become normal.

This irregularity and uncertainty are not only annoying and wasteful, but may at times cause backfiring or other disasterous results.

A gas or liquid fuel burner, when applied to the usual type of household heater, also results in the wastage of a large proportion of the useful heat of combustion due to the passage of the heated products of combustion directly from the heater into the flue. The present invention contemplates the provision of an economizer to receive the flue gases from the heater adapted to absorb the otherwise waste heat from the flue gases and transfer it to the heating medium circulating through the heater, there being also provided a draft creating means so related to the heater, combustion control device, and economizer that an adequate air supply is assured on the initial operation of the burner, such air supply being preferably maintained during combustion, at all other times and under all atmospheric and other conditions.

In the illustrated embodiment of the invention the economizer receives the fuel gases after they have passed the main body of fluid heating surface on their way from the combustion chamber of the heater, and a draft creating device is located on the flue side of the economizer so as to produce a partial vacuum in the combustion chamber and the economizer and create the needed induced draft both on starting and subsequently thereto, this being particularly desirable in the case of intermittently operated combustion devices where the volume of the combustion chamber and back pressure therein, particularly in the case of circuitous flue passages, is such as to make it impracticable to displace the gaseous contents and initiate the necessary draft on starting the burner by means of pressure creating devices applied at the inlet and of the combustion chamber.

By providing the economizer and locating the draft creating device between the economizer and the chimney flue, not only is the wastage of heat checked, but at the same time the operation of the heater and burner is materially improved. A certain air supply may be maintained through the combustion chamber as required, which supply cannot be exceeded or diminished; the pressure creating device operates on relatively cool gases giving a uniform draft; the natural draft, which tends to chill the heating medium when the burner is stopped, is checked and the volume of the space in which the partial vacuum or sub-atmospheric pressure is created by the draft creating device is materially increased.

The invention will be best understood by reference to the following description when taken in connection with the accompanying illustration of one specific embodiment thereof, while its scope will be more particularly pointed out in the appended claims.

Referring to the drawings and to the embodiment of the invention which is there shown (in Fig. 1) for illustrative purposes, the heater 11 may be of the hot air, hot water, steam or any other usual or suitable type, but is herein shown as a furnace employing water as the heating medium. The heater 11 is provided with a combustion device adapted to control the combustion, and herein to supply the required fuel, and to be thrown into or out of operation at will. Such combustion device may operate with oil, coal, gas or other fuel, but herein it is shown for illustrative purposes as comprising an oil or other liquid fuel burner 12, which may be of any usual type, the burner herein shown being of the general construction illustrated in my prior Patent No. 1,631,859 dated June 7, 1927. This burner comprises a small reservoir or tank containing fuel-delivery and atomizing devices driven by the electric motor 13 and operative, when actuated by the motor, to deliver a supply of liquid fuel through the distributing device or nozzle 14 to the combustion chamber 15 constituting the lower portion of the up-draft furnace shown, or more generally, that part of the furnace into which the burner discharges, where it is caused to be initially ignited by suitable ignition devices and to burn therein, means being provided for admitting into the combustion chamber an adequate supply of air to support continued combustion.

Figures 1, 2:
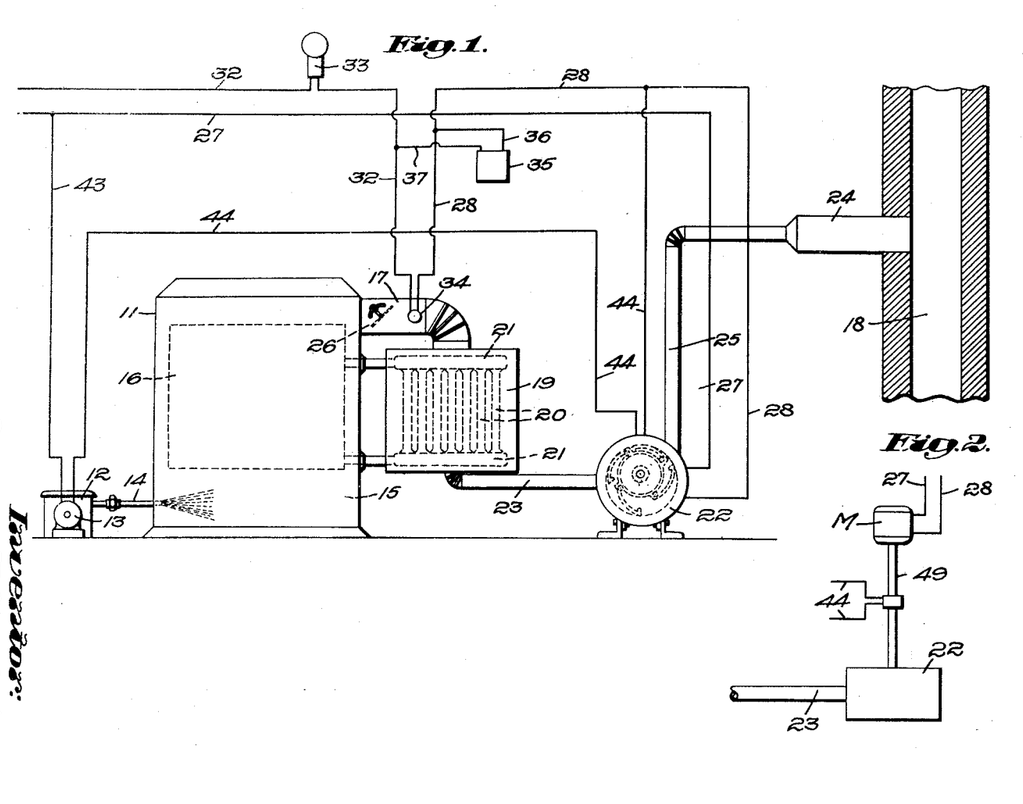
Fig. 1 is an elevation, partly diagrammatic, showing the heater, burner, draft-creating device and controlling circuits therefor.
Fig. 2 is a plan view of the draft-creating device with its associated controlling circuits.
Figure 3:
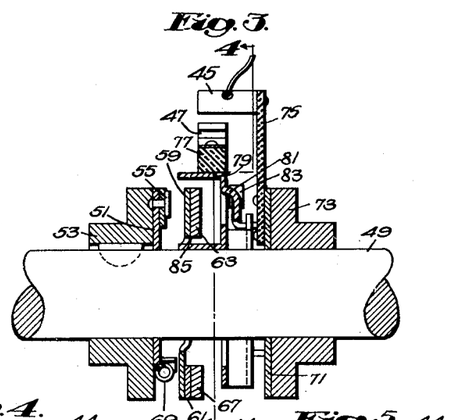
Fig. 3 is a sectional elevation taken through the centrifugal contact-controller on the blower shaft.

The products of combustion, in passing from the combustion chamber 15, after circulating in contact with the pipes, coils or other units employed to present the water heating surfaces (the water space being represented conventionally at 16), enter the flue pipe 17 and pass thence to the chimney flue 18. Due to the draft provisions herein established and to the independence of natural draft, the passage to the chimney flue is not required to be direct and advantage may be taken, even in the case of intermittently operated gas or oil burners, of heat absorption devices designed to extract from the flue gases the waste heat which would otherwise pass into the chimney. Such heat absorption devices, to be effective, ordinarily require more draft-creating pressure than is supplied by natural draft, due to the obstruction presented by the heating surfaces with which they must come in contact and to the circuitous character of the flue passages required thereby.

Herein, for the purpose of illustration and as representative of any desired form of heat absorption device, there is shown interposed between the chimney flue 18 and the flue pipe 17 a heat absorption device in the form of an economizer or stack heater comprising the drum 19 through which the flue gases pass downwardly in contact with the water pipes or coils 20. The cold water returned may be circulated through the pipes or coils 20 before entering the water space of the heater, but herein they are shown connected to the upper and lower levels of the water space through the headers 21. This brings the escaping hot flue gases, first, into contact with the header 21 and upper portions of the pipes 20 where the water is at a relatively higher temperature, and, finally, before leaving the lower part of the economizer, into contact with the lower head 21 and the lower portions of the pipes or coils where the water is at a relatively lower temperature, so that the temperature of the flue gases leaving the economizer is reduced as nearly as possible to a temperature corresponding to that of the water returned to the heater 11 from the heating system.

Suitably positioned with relation to the combustion chamber, and herein between the heat absorption device 19 and the chimney flue 18, there is provided a draft creating device in the form of a blower 22 driven by a motor M (Fig. 2), the blower being connected to the flue pipe by the connecting pipe 23 passing to the bottom of the drum 19 and adapted to draw the flue gases under any desired vacuum from the heater through the heat absorption device and deliver them to the chimney flue 18 through the discharge pipe 24 and the intermediate pipe connection 25.

The pipes 25 and 23 are herein shown of somewhat lesser diameter than the flue pipe 17, and there is also employed a suitable measuring and regulating device, as, for example, the damper 26, in the flue pipe 17, by which the amount of gas flow and air supply can be definitely measured or regulated under the action of the blower, the damper being adjustable so that it can be moved and set to suit the local conditions in any given installation, or the conditions as they may change from time to time.

The blower motor M is supplied with current through conductors 27 and 28, these conductors being connected through a main control switch (not herein shown) to any suitable source of power.

The conductor 28 leads from the blower motor M to a terminal 29 (Fig. 9) of a combustion responsive switch 30 of the rocking, mercury-tube type, the opposite terminal 31 of the switch being connected to the conductor 32 which passes to the main control switch through a temperature responsive control device 33, herein the usual room thermostat, so constructed that when the temperature of the surrounding air drops below a predetermined minimum the circuit 32 is closed.

The switch 30 is associated with a combustion responsive device 34, which may be of the thermostatic type hereinafter described, such device being herein arranged in or adjacent to the flue pipe 17 (Fig. 1) to respond to the temperature of the flue gases and adapted to maintain the switch 30 open, except during such time as the required degree of combustion is maintained, but to close the same after normal combustion has been initiated and for as long as it continues.

To start the blower motor (and the burner motor) there is provided a timing switch 35 connected in shunt to the switch 30 by the conductors 36 and 37, the shunt circuit being normally closed to complete the blower motor circuit when the room thermostat acts. A timing device of usual construction is herein conventionally shown (Fig. 9) comprising the mercury tube 38 pivotally mounted at 39 and normally held in inclined position to cause the immersion and short-circuiting of the switch contacts or electrodes 40 by means of the arm 41 engaging the opposite end of the tube support. The arm 41 comprises a bimetallic thermostatic element and is placed in such relation to a heating coil 42, which is in series with the shunt circuit, that, on the passage of a substantial current maintained for a sufficient time through the coil 42, the thermostatic arm becomes heated and is thereby bent or deflected, moving toward the dotted line position shown. This releases the end of the tube support so that the latter drops and rocks about its pivot, causing the mercury to withdraw from the electrodes, breaking the shunt circuit.

The burner motor 13 is supplied with current through the conductor 43 connected to the conductor 27 and through the conductor 44 which is connected to the conductor 28, there being associated, however, with the burner motor control circuit 44 a controlling device such that the burner motor is started into operation in timed relation to the starting of the blower motor. The arrangement is preferably such that the draft-creating device is started into operation before combustion is initiated, and, in the illustrated embodiment of the invention, a substantial time interval is caused to elapse before the burner motor is permitted to operate after the thermostat has closed the circuit 32 and after the blower motor has started into operation. Preferably, however, the arrangement is such that when the thermostat again opens the circuit 32, both the blower motor and the burner motor are immediately cut out of operation.

The control of the burner motor as above described may be accomplished in a variety of ways, but herein the circuit 44 is normally interrupted at contacts 45 (Figs. 4 and 9) associated with the blower and the blower motor, the contacts being adapted to be bridged and the circuit closed by a bridging switch 47 actuated only after the blower has been in operation for a substantial time interval. Herein the bridging switch is controlled by a centrifugal device of well known type mounted on the blower motor shaft 49, and shown in detail in Figs. 3 to 6 inclusive.

Referring to Figs. 3 to 6 inclusive, the centrifugal device comprises an annular plate 51 secured to the side of a collar 53, the latter fixed on the blower shaft 49 to turn therewith. On the side of the plate 51 there are pivoted at equi-distant intervals at the point 55 three overlapping segmental or arc-shaped fingers 57, 59 and 61 to which there are attached weighted plates 63, 65 and 67 respectively. When the blower shaft is at rest these fingers are drawn radially inward by springs 69 connected each at one end to one of the fingers and at the opposite end to the plate 51, these springs serving to contract the fingers to the position illustrated in Fig. 4. When the blower motor shaft is driven at full speed, the fingers move outwardly on their pivots into the position shown in Fig. 5.

The contacts 45, which are controlled by the herein described centrifugal device, are supported by a small plate or frame 71 (Figs. 3 and 6) secured to the collar 73 loosely mounted on the blower shaft 49 and held in fixed, non-rotatable position by a suitable frame or casing, not herein shown. To the plate 71 there is secured the insulating support 75 (Fig. 3) carrying the contacts 45. The cooperating bridging switch 47 is supported by the block 77 of insulating material carried by the segmental shoulder 79 of a vertically sliding frame 81, the latter mounted for vertical sliding movement in suitable guides carried by the plate 71. The frame 81, with its bridging switch, is controlled as to its position by the two leaf springs 83 (see Fig. 6) so related to the plate 71 and frame 81 that they tend yieldably to retain the frame in either extreme position to which it may be moved vertically by the centrifugal device, that is to say, in either the open position shown in Fig. 4 or the closed position shown in Fig. 5.

Figure 4:
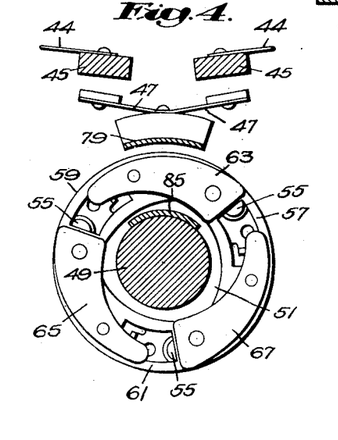
Fig. 4 is a sectional elevation on line 4—4 in Fig. 3 showing the contacts open.
Figure 5:
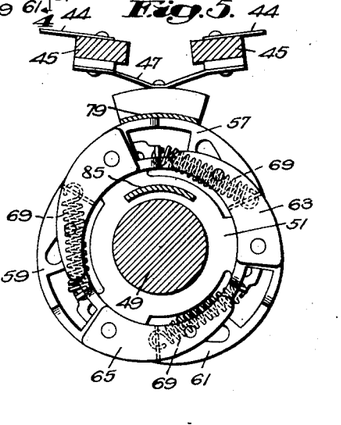
Fig. 5 is a similar view, showing the contacts closed.
Figure 6:
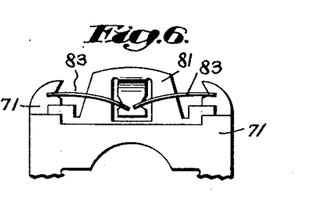
Fig. 6 is a detail showing the spring control for the sliding, contact-carrying member.

The plate 71 and the frame 81 are so positioned that the shoulder 79 lies over and within the vertical path of the fingers 57, 59 and 61, so that, when the fingers are spread or extended, the lower face of the shoulder is engaged thereby, the frame moved up, and the bridging switch snapped to and held in the closed position shown in Fig. 5. The frame 81 is also provided with a second projecting segmental shoulder 85 which projects into the annular opening formed between the expansible fingers and the shaft 49 and is so related to the fingers that when this opening is contracted by the inward movement of the fingers, the shoulder 85 is engaged thereby and the sliding frame moved downwardly to throw and hold the switch in the open position shown in Fig. 4.

Accordingly, when the blower is at rest, the switch is open as shown in Fig. 4, rendering the burner motor inoperative. When the circuit of the blower motor is closed, however, the blower starts into operation, and as its speed increases the fingers move gradually outward so that after the lapse of a substantial interval and when full speed or approximately full speed has been attained, the shoulder 79 is engaged by the fingers and the controlling switch is thrown to its closed position, as shown in Fig. 5, thereby closing the burner motor circuit. When the room thermostat acts subsequently to open the blower motor circuit, the blower again comes to rest and the switch is again returned to the open position as shown in Fig. 4. The centrifugal device is so designed as to provide an interval following the starting of the blower and before the operation of the burner such as to establish the required draft conditions in the flue.

Figure 9:
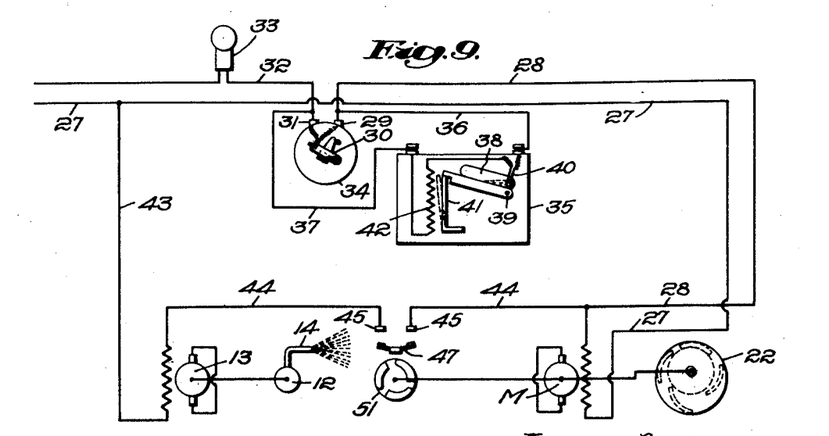
Fig. 9 is a diagram of the control circuits employed in the installations illustrated in Fig. 1.

The operation of the apparatus so far as described will be readily understood from Figs. 1 and 9. With the thermostat 33 open, the burner is inactive and the blower at rest. When the room temperature drops sufficiently to cause the thermostat to close the circuit 32, the blower motor M is immediately energized, causing the blower to start into operation, creating a partial vacuum in the combustion chamber and the economizer and a current of fresh air therethrough, displacing any inert or damp gases remaining therein or in the flue passages and initiating a gaseous flow through the combustion chamber and flue passages which, after the blower has attained normal speed, reaches and continues at a certain amount which may be exactly fixed by the preadjustment of the damper 26 or increasing or decreasing the capacity of the blower. Until the blower attains its normal speed and normal draft conditions have been initiated, the burner motor remains at rest, but when that condition is reached the burner motor circuit 44 is closed by the centrifugal switch 47, starting the burner into operation, and the normal draft conditions being already initiated the normal combustion immediately follows.

When the room thermostat closes, the starting circuit for the blower motor is through the conductor 32 and the timing switch circuit, the latter comprising the conductor 37, heating coil 42, electrodes 40, conductor 36 and conductor 28 to the blower motor, and thence through the conductor 27 to the main control switch (not shown). When the switch 47 closes the burner motor circuit, the starting circuit for the burner motor is through the same shunt circuit and timing switch, conductor 28, conductor 44 to the motor 13, and thence through the conductor 43 to the conductor 27.

As soon as effective combustion takes place, the combustion responsive device 34 in the flue pipe 17 responds to the increased temperature, causing the mercury-tube switch 30 to rock and close the switch, directly connecting the conductors 28 and 32, and thereby reducing the current through the shunt circuit and heating coil 42 to a point where no substantial heating effect is produced by the coil. If normal combustion does not take place and if the combustion responsive switch 30 fails to act within a predetermined time, indicating some defect or trouble in the burner mechanism, the switch 38 is thrown open through the action of the heating coil 42, breaking the shunt circuit and cutting out both the blower motor and the burner motor. If the switch 30 is thrown within the predetermined time interval, then the burner motor continues to function and the blower continues in operation for as long as combustion is maintained, assuring at all times during the action of the burner the necessary draft conditions.

The timing device is so arranged as to allow an adequate time interval to elapse, before opening the blower motor circuit, for the blower to reach its normal speed and thereafter for the burner, under its normal functioning, to initiate the required combustion. When the room temperature rises to a point sufficient to open the circuit at the room thermostat, both the blower motor and the burner motor are immediately cut out of circuit, and this is followed by the opening of the combustion responsive switch 30, restoring the parts to their initial condition until such time as the thermostat again closes the control circuit.

If, on the stoppage of the burner, a substantial natural draft is established, the air passing through the heater tends to chill the heater and abstract heat from the heating medium. The interposition of the economizer, with its pipes or coils which serve as baffles for the fuel gases, tends to check the establishment of such a natural draft, and such draft is further opposed by the fact that the flue gases from the combustion chamber pass in a generally downward direction through the economizer and thence upward through the chimney flue, so that, except when the blower is in operation, the natural draft tends to be suppressed and the cooling of the heater impeded and delayed. If desired, positive means for stopping the natural draft may be employed, and herein for that purpose the blower is shown of the positive displacement type, equipped with vanes mounted on an eccentric rotor, so that on the stoppage of the blower the latter acts as a damper device, closing the passage connecting the pipes 23 and 25.

The centrifugally controlled switch is shown merely as illustrative of one of the various ways in which control over the burner may be exercised, such that combustion is initiated at the heater only after the proper draft conditions have been initiated at the heater.

In addition to assuring the establishment of proper initial draft conditions, the draft-creating device also assures the maintenance of uniform draft conditions at all times during the operation of the burner. The efficient operation of a gas or liquid fuel burner requires a supply of air at a uniform rate and of a fixed, predetermined amount, depending on the type of burner, its adjustment and the quantity of liquid fuel delivered. Under ordinary draft conditions this amount is subject to more or less variation, dependent on the weather and atmospheric conditions and the directness or indirectness, as well as the condition of the flues. The use of the draft device herein described not only establishes the required draft conditions in advance of the combustion, but maintains such draft conditions at a fixed, uniform and predetermined amount irrespective of all other factors.

Figure 7:
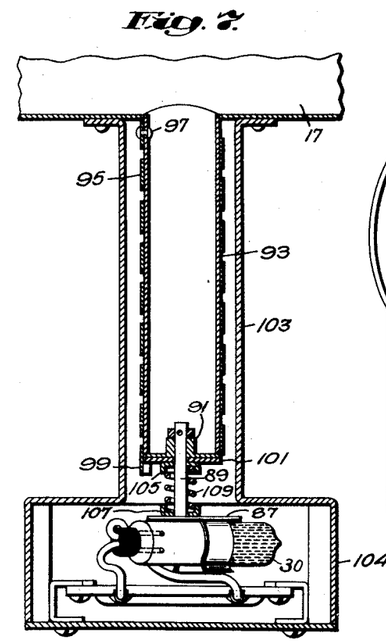
Fig. 7 is a section in plan showing one form of combustion responsive control device.
Figure 8:
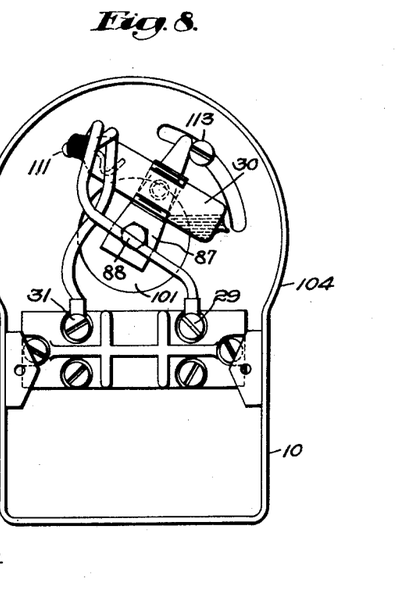
Fig. 8 is an end elevation of the latter.

In Figs. 7 and 8 I have shown an improved form of combustion responsive device for actuating the mercury tube switch 30. Referring to Figs. 7 and 8, the mercury tube 30 is carried by the swinging arm 87 secured to the rock shaft 89 which is journaled in the hub 91 carried by the closed end of the elongated tubular sleeve 93, the opposite or open end of which communicates with the interior of the flue 17 to which it is fixedly secured. The tubular sleeve 93 is surrounded by a helix 95 formed by a flat strip of thermostatic metal, one end of the helix being anchored at 97 to the sleeve 93, and the opposite or free end 99 being secured to a disk 101 loosely mounted on the rock shaft 89 outside of the closed end of the sleeve 93. The helix is contained within an annular space formed between the sleeve 93 and an external cylindrical casing 103, also secured to the flue pipe 17, which casing terminates in the enlargement 104, the latter forming a housing for the switch and the terminals thereof.

When cold, the helix contracts and is preferably in close association with the walls of the inner sleeve 93, the interior of which is open to the flue gases. When combustion is initiated the temperature within the sleeve 93 rises, the helix becomes heated and expansion thereof takes places, causing the end 99 to move in a circular path, turning the disk 101 in a counterclockwise direction, as viewed in Fig. 8. Between the disk 101 and the arm 87 a friction connection is provided comprising the washer 105 bearing against the disk 101, and a similar washer 107 bearing against the arm 87, the washers being forced each against its seat by the intervening spring 109 the arrangement being such that, as the helix expands and the disk turns, the arm 87 is moved counterclockwise until it engages the stop 111. On the cessation of combustion when the helix subsequently contracts, the arm is moved in the opposite direction against the stop 113, the movement of the arm being limited by the two stops and any over-travel of the disk merely resulting in slippage at the intervening frictional connection. Accordingly, as the helix expands in response to the combustion of the burner, the mercury tube switch is rocked to its closed position, and when the combustion ceases the helix contracts and the switch is rocked back to its open position.

In combustion responsive devices of this character employing thermostatic responsive metal, the expansion characteristics of the metal are subject to change and the metal tends to age and deteriorate through continued direct exposure to the products of combustion. In the described form of controlling device, the thermostatic metal is maintained out of the direct path and out of direct contact with the flue gases.

Figure 10:
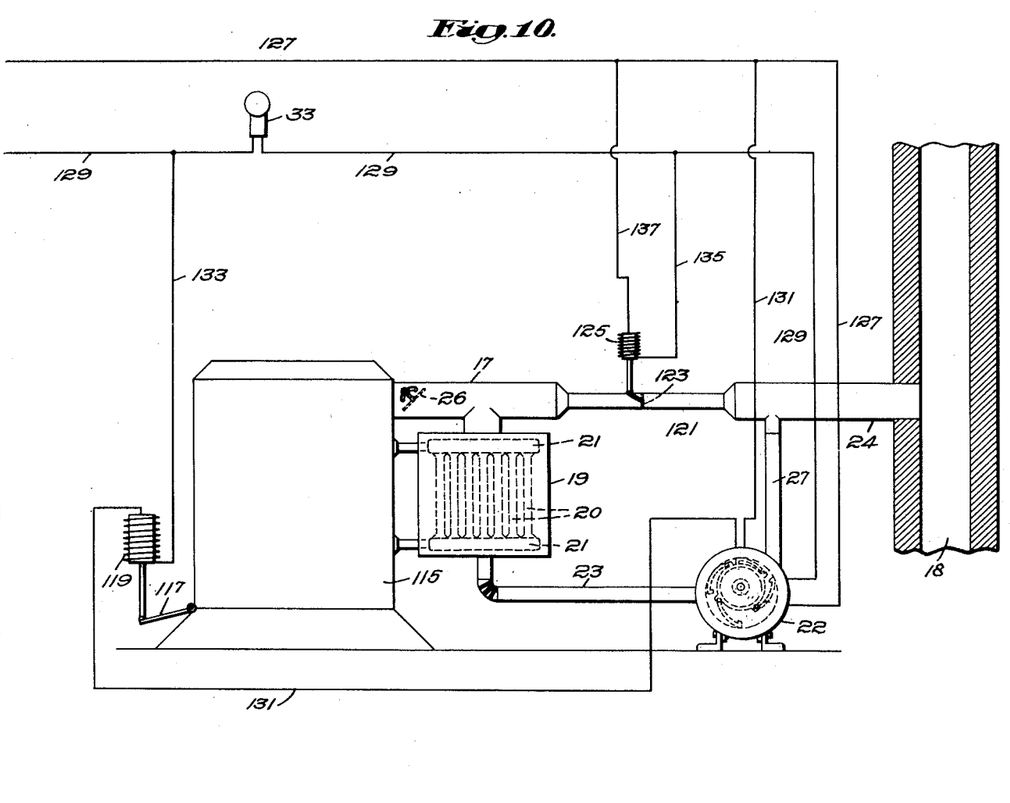
Fig. 10 shows the application of certain features of the invention to a heater when the combustion is constantly maintained.

In Fig. 10 I have shown the application of certain features of the invention to a heater, wherein a continuously maintained combustion is provided and the draft-creating device or blower is controlled conjointly with a combustion control device in the form of automatically regulated damper means.

Referring to the drawings, I have there shown a heater 115 of the coal burning type, combustion in which is regulated by means of a damper 117 controlled by the solenoid 119. This heater is equipped with a heat absorption device 19, similar to that already described, and with flue connections, also similar to those described, including the motor driven blower 22. In connection with this form of heater, however, a bypass flue 121 is provided adapted when open to provide a direct connection between the flue passage 17 and the chimney flue 18 independent of the blower 22. The bypass flue 121 is controlled by a damper 123 adapted to be closed by the solenoid 125.

The operation of this apparatus is as follows: When the thermostat 33 closes, the blower motor is started into operation by current passing to the motor through the conductors 127 and 129. When the blower motor has reached its normal speed, a centrifugally controlled switch, similar to that already described, closes a circuit comprising the conductor 131 connecting with the conductor 127 and extending to the solenoid 119, the opposite terminal of the solenoid being connected by conductor 133 to conductor 129. This causes the energization of the solenoid, opening the damper to the position shown. At the same time, the solenoid 125 is energized to close the damper 123 by means of a shunt circuit, the latter comprising the conductor 135 connected to the conductor 129 and the conductor 137 connected to the conductor 127. The full required draft has now been created and is maintained until the thermostat again acts to open the circuit 129, whereupon the blower motor is stopped. Simultaneously, on the stoppage of the blower motor, the solenoid 125 is deenergized, causing the opening of the damper 123, and the stoppage of the blower motor is followed by the deenergization of the solenoid 119, causing the closure of the damper 117. Under these conditions the forced draft ceases, while the bypass flue 121, which is restricted in size, remains open to allow the escape of such gases as may result from a banked or inactive fire.

While I have herein shown and described for purposes of illustration one specific embodiment of the invention and one particular application thereof to a specific form of heater, it is to be understood that the same may be applied to other types of combustion devices and may be embodied in widely different forms, all without departing from the spirit of the invention.

I claim:

1. In a heating system, a furnace provided with a fluid fuel burner and a flue for the products of combustion thereof, a power-driven draft producing device of the positive displacement type connected to create a draft in said furnace; and means for starting and stopping said power-driven device and said fluid fuel burner, said means providing for starting said power driven device to establish a draft before starting said burner and for stopping said power driven device when said burner is stopped to thereby not only suspend induced draft through the system but also check any natural draft therethrough by the character of said power driven device; whereby provision is made for the establishment of an induced draft prior to starting of said burner to avoid excessive pressures in said combustion chamber, the maintenance of proper draft during operations of said burner and the checking of natural draft after stoppage of said burner to prevent dissipation of heat thereby, thus to improve the efficiency of the system.

2. In a heating system, a furnace provided with a fluid fuel burner and a flue for the products of combustion thereof, a power-driven draft producing device of the positive displacement type connected to create a draft in said furnace; and means for starting said power-driven device and said burner and for stopping said power driven device when said burner is stopped to thereby not only suspend induced draft through the system but also check any natural draft therethrough by the character of said power-driven device; whereby provision is made for the establishment and maintenance of proper draft during operations of said burner and the checking of natural draft after stoppage of said burner to prevent dissipation of heat thereby, thus to improve the efficiency of the system.

3. In a heating system including a fluid heating furnace having a combustion chamber and provided with an oil burner adapted to be started and stopped; means for regulating the draft and combustion of the oil in the starting and operation of said oil burner comprising an economizer separate from said combustion chamber and containing members for circulating fluid medium to be heated, a flue for conducting the products of combustion from said combustion chamber through said economizer, a flue for conducting the flue gases away from the economizer, said flues and economizer arranged to constitute a draft-suppressing path in which gases cooled by said economizer tend to settle and be trapped, provisions for draft control comprising a power-driven means in said last named flue, said means when put into operation acting to overcome the draft suppressing effect aforesaid and to establish an induced draft lowering the pressure in said combustion chamber and economizer and first named flue, and control means including a thermostat responsive to the temperature of the space to be heated for starting and stopping said power driven means and said burner, said control means providing for starting said power driven means before starting of said burner to overcome the draft suppressing effect aforesaid and to lower the pressure in the extended area of said combustion chamber and economizer and first named flue to thus prevent backfiring upon ignition of the oil and reduce noisiness of combustion thereof by reason of the large expansion area provided, and said control means further providing for stopping said power driven means when said burner is stopped to reinstate said draft suppressing effect and conserve heat which would be carried away from said combustion chamber and economizer and the heated fluid medium were it not for the suppressing of natural draft by said arrangement.

4. In a heating system including a fluid heating furnace having a combustion chamber and provided with an oil burner adapted to be started and stopped; means for regulating the draft and combustion of the oil in the starting and operation of said burner comprising an economizer separate from said combustion chamber and containing members for circulating fluid medium to be heated, a flue for conducting the products of combustion from said combustion chamber in a generally downward direction through said economizer, a flue for conducting the flue gases away from the lower end of the economizer and thence in a generally upward direction, said flues and economizer thus constituting a stagnating draft suppressing path in which the combustion products are cooled before delivery to the lower portions of the path to settle and be trapped thereat; provisions for draft control comprising an artificial draft producing means in said last named flue, said means when put into operation acting to overcome the draft suppressing effect aforesaid and to establish an induced draft lowering the pressure in said combustion chamber and economizer and first named flue, and control means including a thermostat responsive to the temperature of the space to be heated for starting and stopping said artificial draft producing means and said burner, said control means providing for starting said artificial draft producing means before starting of said burner to overcome the draft suppressing effect aforesaid and to lower the pressure in the extended area of said combustion chamber and economizer and first named flue to thus prevent backfiring upon ignition of the oil and reduce noisiness of combustion thereof by reason of the large expansion area provided, and said control means further providing for stopping said artificial draft producing means when said burner is stopped to reinstate said draft suppressing effect and conserve heat which would be carried away from said combustion chamber and economizer and the heated fluid medium were it not for the suppressing of natural draft by said arrangement.

In testimony whereof, I have signed my name to this specification.

GEORGE E. GOODRIDGE.